United States Patent [19]

Aldrich et al.

[11] 4,119,067
[45] Oct. 10, 1978

[54] ENGINE WITH CHARGE EQUALIZING INTAKE MANIFOLD

[75] Inventors: William L. Aldrich, Lake Orion; John M. Sawruk, Pontiac, both of Mich.

[73] Assignee: General Motors Corporation, Detroit, Mich.

[21] Appl. No.: 747,962

[22] Filed: Dec. 6, 1976

[51] Int. Cl.² .................. F02B 75/18; F02M 29/04
[52] U.S. Cl. ........................... 123/52 MB; 123/141
[58] Field of Search ......... 123/52 M, 52 MV, 52 MB, 123/52 MC, 141; 261/78 R; 48/180 B, 180 R

[56] References Cited

U.S. PATENT DOCUMENTS

| | | | |
|---|---|---|---|
| 1,333,142 | 3/1920 | Ulmer | 123/52 M |
| 1,768,551 | 7/1930 | Fekete | 123/52 MC |
| 1,771,886 | 7/1930 | Fekete et al. | 123/52 MC |
| 2,043,079 | 6/1936 | Timian | 123/52 M |
| 2,163,040 | 6/1939 | Jacoby | 123/52 M |
| 3,054,390 | 9/1962 | Meurer et al. | 123/52 M |
| 3,374,775 | 3/1968 | Ferguson | 123/52 M |

*Primary Examiner*—Charles J. Myhre
*Assistant Examiner*—Craig R. Feinberg
*Attorney, Agent, or Firm*—Robert J. Outland

[57] ABSTRACT

An internal combustion engine, particularly a four cylinder four stroke cycle engine, has adjoining cylinders arranged in pairs with adjacent or siamesed intake ports and timed sequentially so that the intake event of one of the adjoining cylinders overlaps or closely follows the intake event of the other of the adjoining cylinders. The adjacent intake ports of the adjoining cylinders are fed by common manifold runners which are offset at their connections with their respective intake ports to favor delivery of air-fuel mixture to the first of the sequentially timed cylinders to a degree to offset inherent manifold pulsing effects that tend to favor delivery of a larger charge to the second of the sequentially timed cylinders. Thus, charge distribution among the engine cylinders is substantially equalized. The engine manifold also includes ridges adjacent the mixture plenum extending transversely across the flat manifold floor to direct liquid fuel crossing the ridges up into the airstream for mixing and vaporization.

4 Claims, 4 Drawing Figures

ENGINE WITH CHARGE EQUALIZING INTAKE MANIFOLD

This invention relates to internal combustion engines and, more particularly, to multiple cylinder engines wherein related adjacent paired cylinders have adjoining intake ports fed by a common manifold runner and wherein the timing of the related cylinders is such that their intake strokes overlap or closely follow one another. In a specific embodiment, the invention relates to a four cylinder four stroke cycle in-line engine having the end cylinders sequentially timed with adjoining intake ports fed by a common runner of a dual runner intake manifold.

It is known in the art relating to internal combustion engines of the four stroke cycle type that a four cylinder in-line four stroke cycle engine is usually arranged so that the crank throws of all the cylinders lie in the same plane, the throws of the end cylinders extending in one direction and the throws of the center cylinders extending in the direction opposite those of the end cylinders. This arrangement provides for balancing primary unbalance forces in the inter-connected piston and crankshaft assemblies of the engine and provides even firing intervals for the cylinders when a proper firing order is selected. Such a firing order requires that the pair of cylinders at one end be fired alternately with the pair of cylinders at the other end and that the adjoining cylinders of each pair be timed sequentially.

In order to provide simple manifolding arrangements for four cylinder in-line engines, it is common to make adjoining the intake ports of the paired cylinder at each end of the engine for connection with a single runner of a dual runner intake manifold. However, when coupled with sequential timing of the adjacent end cylinders, such an arrangement inherently tends to cause the last filled of the sequentially timed adjacent cylinders to receive a relatively larger charge of air-fuel mixture than the first timed cylinder of the related pair. This results from the flow dynamics developed in the intake manifold which undergoes a pulsing flow pattern alternating in direction toward first one pair of end cylinders and then the other.

In the past, many four cylinder engines have been operated without providing means to offset this charge unbalancing effect. Where attempts have been made to provide more evenly balanced cylinder charging, they have often taken the form of complicating the intake port and manifolding arrangement by providing separate manifold runners and ports for each cylinder.

The present invention accomplishes the desired charge balancing in a four cylinder engine of the type described by the surprisingly simple expedient of offsetting the connections of the manifold runners with their respective adjoining pairs of cylinder intake ports such that the physical passage arrangement favors delivery of a greater cylinder charge to the first of the sequentially timed cylinders of each related pair. The amount of offset is selected to balance the inherent manifold pulsing effect which favors delivery of a greater charge to the last of the sequentially timed cylinders. With a proper design, these offsetting factors balance out so that the engine is provided with substantially equal charges of air-fuel mixture to all of its cylinders.

In order to reduce the further unbalancing effect of liquid fuel running along the floor of the intake manifold and the preferential delivery of such fuel to the lowest lying of the cylinders, the manifold further provides transverse ribs in the floor at the entrances of its runners. The ribs are arranged so that they tend to lift fuel passing over them up into the airstream, which is accelerated over the rib surfaces, thus aiding vaporization and equal distribution of liquid fuel delivered to the central manifold plenum.

These and other advantages of the invention will be more fully understood from the following description of a preferred embodiment taken together with the accompanying drawings.

Figure 1:
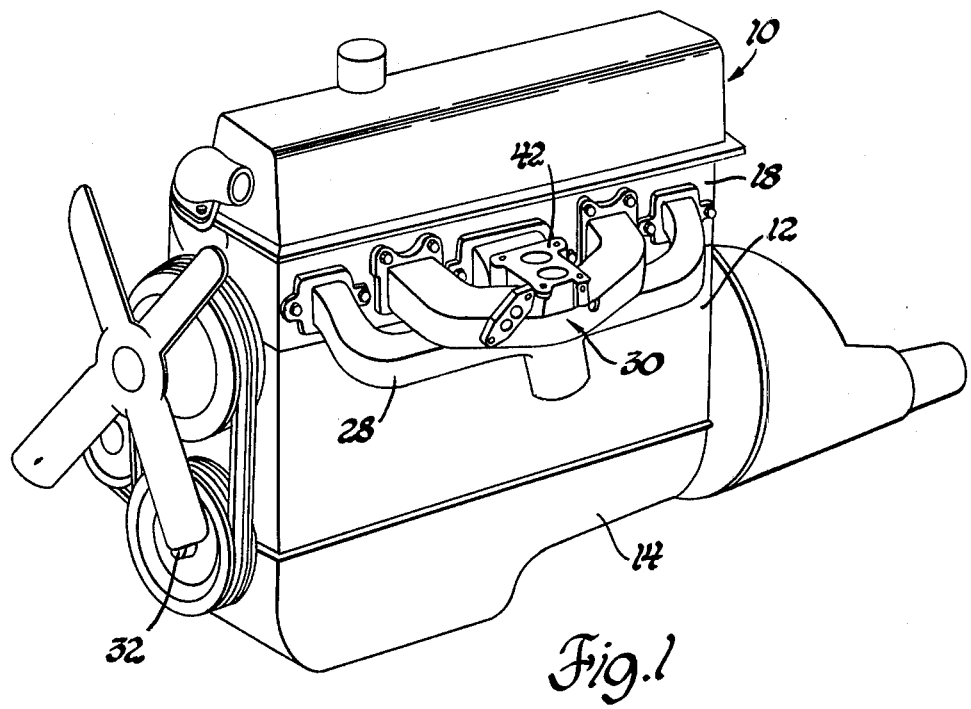
FIG. 1 is a pictorial view of a four stroke cycle four cylinder internal combustion engine having intake ports and manifolding formed in accordance with the invention.
Figure 2:
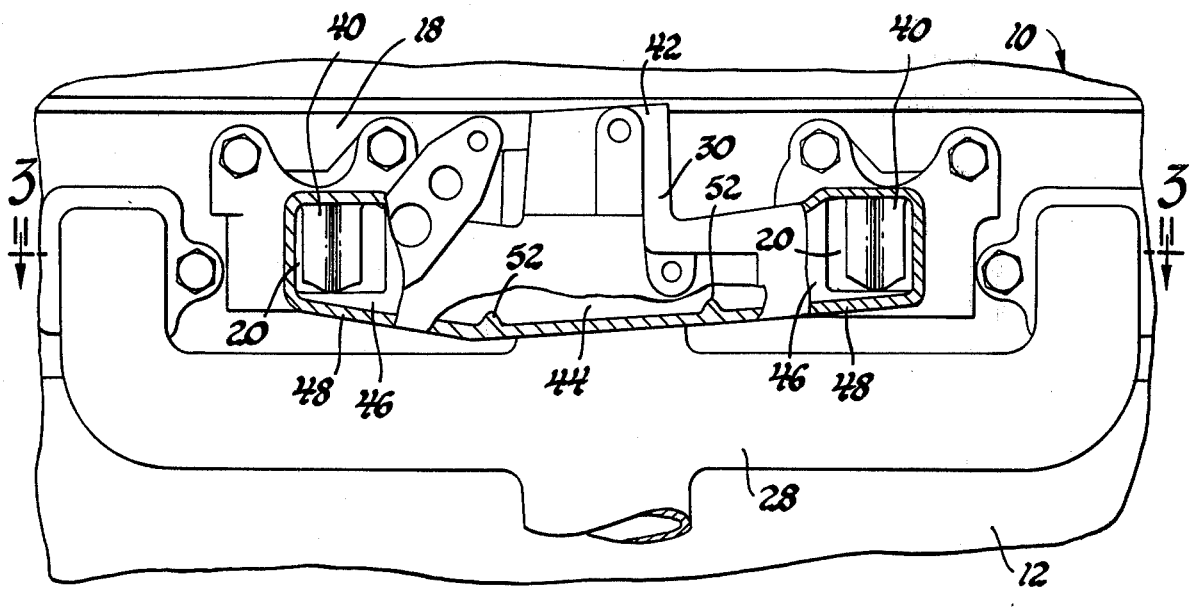
FIG. 2 is a fragmentary side view of the engine of FIG. 1 having portions broken away to illustrate certain features of the intake manifold and port arrangements.

Referring now more particularly to the drawings, there is shown an internal combustion engine generally indicated by numeral 10. The engine is of the four stroke cycle, spark ignition, four cylinder in-line type used in many automotive applications. It includes the usual cylinder block 12 closed on the bottom by an oil pan 14 and having a plurality of cylinders 16 defining variable volume combustion chambers and identified numerically as cylinders 1, 2, 3 and 4.

The upper ends of the cylinders are closed by a cylinder head 18 of conventional construction and having cylinder inlet ports 20 and exhaust ports 22 which are controlled respectively by inlet poppet valves 24 and exhaust poppet valves 26. An exhaust manifold 28 and an intake manifold 30 are mounted on one side of the cylinder head, connecting with the exhaust and intake ports, respectively.

Figure 4:
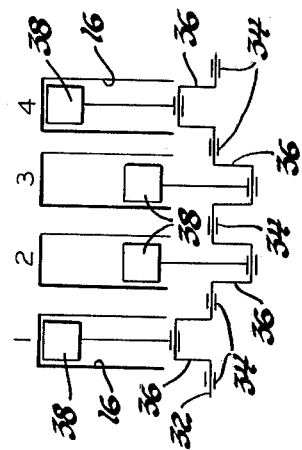
FIG. 4 is a diagrammatic view illustrating the piston and crank arrangement of the engine of FIGS. 1–3.

At the bottom of the cylinder block 12 there is supported a crankshaft 32 which, as is shown diagrammatically in FIG. 4, is rotatably supported in bearings 34 and has four spaced crank throws 36, one for each of the four cylinders. Each of the throws is conventionally connected with a piston 38 reciprocably disposed in its respective cylinder. It will be noted that all the throws lie in a common plane and that the throws of the end cylinders 1 and 4 extend in one direction, while those of the center cylinders 2 and 3 extend in the opposite direction. Thus pistons 1 and 4 are up when pistons 2 and 3 are down, and primary balance of the rotating and reciprocating masses is provided for.

In order to obtain even firing of the cylinders with the crank arrangement described, it is necessary that the pairs of end cylinders 1, 2 and 3, 4 be fired alternately and that the cylinders of each pair be fired sequentially. Thus a common firing order for a four cylinder engine of this type and the firing order chosen for this engine is 1-3-4-2, to use the common manner of expression. With this arrangement, it can be seen that cylinder 1 fires 180° after cylinder 2 and cylinder 4 fires 180° after cylinder 3. Thus the paired end cylinders fire sequentially with the inner cylinders 2, 3 leading the outer cylinders 1, 4.

It will be noted that in order to provide a simple form of intake manifold, the intake ports 20 in the cylinder head are arranged in adjoining pairs, with the ports of the two end pairs of cylinders being grouped in a longitudinally, closely spaced (or adjoining) arrangement which forms a single opening in the cylinder head wall on which the intake manifold is mounted. The associated (adjoining) ports are separated by dividing walls 40 which terminate near the outer ends of the ports.

The intake manifold 30 is provided with a central mounting boss 42 for mounting a carburetor, in this case of the two barrel type, which is not shown in the drawings. Below the mounting boss 42 is an internal plenum 44 into which air-fuel mixture is delivered from the carburetor. Extending in either direction from the plenum 44 are runners 46 which are of generally rectangular cross-sectional shape, of substantially the same area throughout most of their length and have generally flat floors 48.

The runners 46 extend in opposite directions from the plenum longitudinally to points opposite their respective pairs of inlet ports 20. Here the runners are curved and directed laterally inwardly to enlarged inner end portions 50, which connect with the double intake port openings of the end cylinders of the engine. Thus one of the runners 46 connects with the intake ports 20 of the front pair of cylinders 1 and 2, while the other runner 46 connects with the intake port openings 20 of the rear pair of cylinders 3 and 4.

Because of the firing order of the engine and the manifold and intake port arrangement, the air-fuel mixture in the manifold runners moves in what might be termed a pulsing pattern. For example, with the firing order restated as 2-1-3-4 and recognizing that the pattern of the intake strokes is in the same order, it becomes apparent that the mixture flow in the manifold runners alternates, with the inner cylinders 2, 3 having their intake strokes during the intial periods of flow in their respective runers and the outer cylinders 1, 4 having their intake strokes during the final periods of flow in their respective runners. The open periods of the intake valves are such that the intake stroke of cylinder 2 is ending about the same time as that of cylinder 1 is beginning so that the flow of mixture in the runner feeding cylinders 1 and 2 is essentially continuous over the time during which both cylinders 2 and 1 have their sequential intake strokes. The same result obtains in the runner feeding cylinders 3 and 4.

The result is that the first timed cylinders of the pairs of sequentially firing cylinders, that is cylinders 2 and 3, are required to accelerate the flow of mixture in their respective manifold runners from zero up to the normal fill rate during the period of their respective intake strokes. The outer cylinders, on the other hand, have the benefit of taking their intake strokes from a manifold runner in which the mixture is already flowing toward those cylinders. Thus the dynamic flow conditions brought about by the pulsing flow in the manifold runners tend to favor filling of the last of the sequentially firing cylinders (1 and 4) with a greater charge of mixture than would be delivered to the first of the sequentially firing cylinders (2 and 3), all other things being equal.

Figure 3:
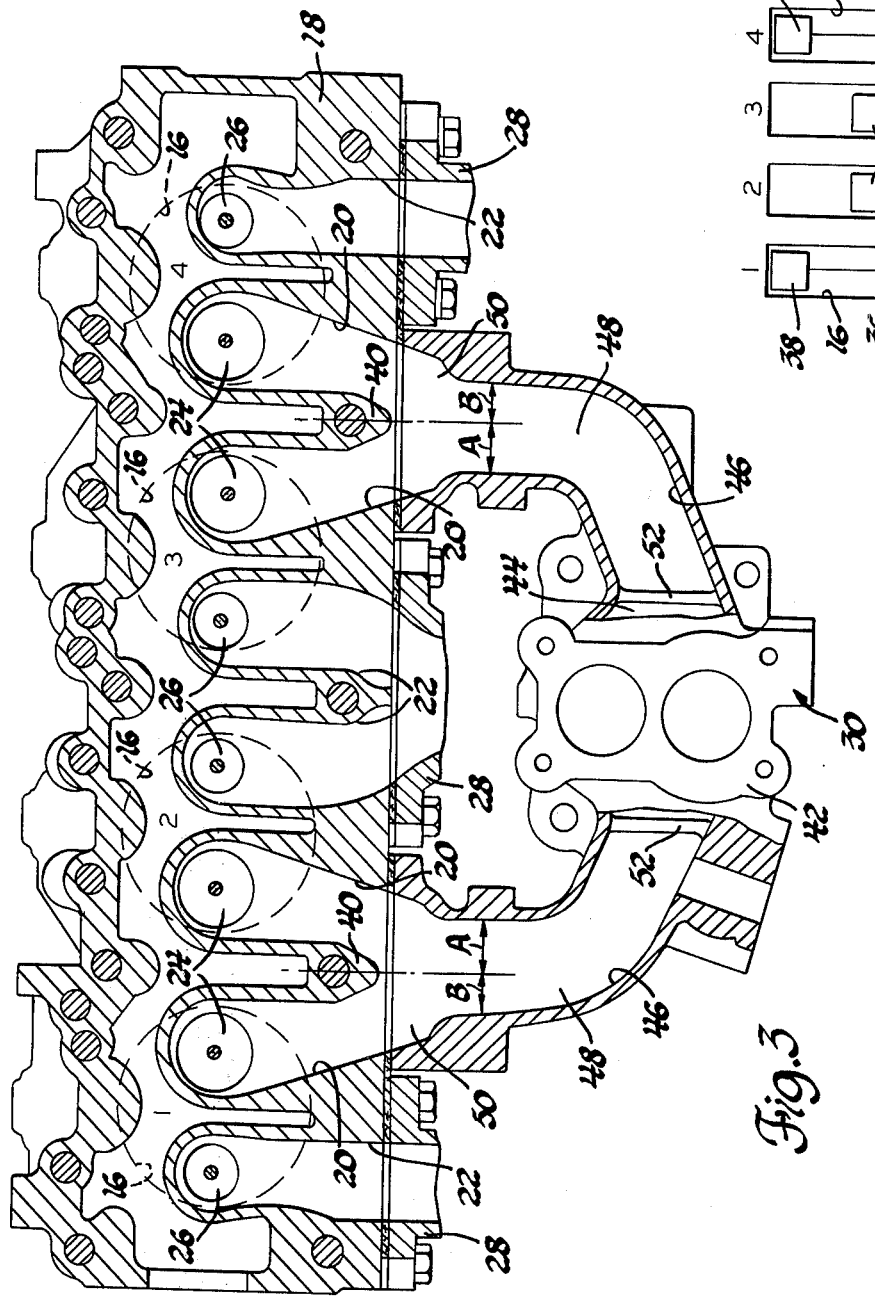
FIG. 3 is a horizontal cross-sectional view through the intake ports and manifold of the engine taken in the plane generally indicated by the line 3—3 of FIG. 2.

In the present invention, this tendency toward unequal charge distribution brought about by the dynamic pulsing condition in the intake manifold is overcome by offsetting the positions of the manifold runners at their points of connection with their respective double intake ports so that the direction of flow from the runners to the inlet ports favor greater charging of the inner cylinders in an amount that essentially balances the pulsing effect. This offset is best shown in FIG. 3 by the indication that the projected centers of the walls 40 that separate the two adjoining intake ports 20 of the end cylinders are spaced unequal distances from the side walls of their respective manifold runners 46 immediately beyond the enlarged portions 50 at the ends of the runners. Thus the distances A from the projected centers of walls 40 to the inner walls of the manifold runners is larger than the distances B from the centers of walls 40 to the outer walls of the manifold runners. This physical offset provides easier entry of the flowing mixture into the inner cylinders 2 and 3 than into the outer cylinders 1 and 4, thus offsetting the manifold pulsing effects and substantially equalizing charge distribution to the various engine cylinders.

One additional problem of manifolds of the type shown is that a certain amount of unvaporized liquid fuel is deposited on the bottom wall of the manifold as the airfuel mixture is delivered to the manifold by the carburetor. This mixture tends to move outwardly along the bottom wall, pushed along by the flow of air-fuel mixture adjacent the bottom wall and, depending upon the relative heights of the intake ports, the attitude of the engine in the vehicle and the attitude of the vehicle itself, the distribution of liquid fuel to the cylinders may be unequal.

In the present design, this problem is overcome to some extent by the placement of laterally extending ribs 52 on the manifold floor at either side of the plenum at the entrances to the manifold runners 46. These ribs tend to direct outwardly moving liquid fuel in an upward direction into the flow of air which is accelerated somewhat as the air-fuel mixture passes over the ribs. Here, the liquid fuel tends to become entrained in the air and atomized or vaporized before it reaches the end of the manifold runners. The bottom of the floor 48 in the plenum portion between the ribs 52 is arranged to be normally level as the engine is installed in its vehicle so that the distribution of fuel to the ribs is as even as possible during normal operation of the vehicle.

From the foregoing description it may be seen that the novel features of the intake manifold arrangement combined with the four cylinder engine arrangement of the preferred embodiment combine to provide advantages in the even distribution of the air-fuel mixture to the cylinders of engines of the type described. While the specific embodiment chosen for illustration involves a four cylinder arrangement, it should be apparent that the principles of the invention could also be applied to other multiple cylinder engine arrangements wherein diverse cylinder pairs fed by common runners are timed with overlapping or contiguous intake events. Since these and other modifications could easily be made without departing from the inventive concepts described, the invention is intended to be limited only by the language of the following claims.

What is claimed is:

1. In combination in an internal combustion engine,
means defining four variable volume combustion chambers aligned longitudinally and grouped in two longitudinally spaced pairs of chambers, each chamber having an intake port with the intake ports of each pair of chambers being closely spaced longitudinally at their ends for connection with a common manifold runner and the ends of the closely spaced pairs of ports being longitudinally spaced a substantial distance apart,
means for operating said chambers in sequential cycles including intake events which occur sequentially in the chambers of each pair and alternately in the separate pairs of chambers, an intake manifold having a central plenum and a pair of runners extending oppositely from said plenum, each of said runners being connected with one of said spaced pairs of intake ports such that the sequential chamber intake events occurring alternately in the spaced pairs of chambers cause alternate pulses of fluid motion in the manifold runners with the flow dynamics tending to cause delivery of a relatively smaller charge to the first one of the sequentially timed combustion chambers of each pair, and the improvement wherein the ends of the manifold runners are offset at their connections with their respective pairs of intake ports in directions toward said first timed chambers, such that the runners are more directly aligned with the intake ports of said first timed combustion chambers of the sequentially timed pairs than with the intake ports of the last timed chambers of such pairs to an extent to offset the manifold pulsing effect and tend to equalize charge distribution.

2. The combination of claim 1 wherein said intake manifold has a generally flat floor in said plenum and extending into said runners and further includes transverse ridges in the floor at the runner entrances on either side of said plenum, said ridges being effective to direct liquid fuel from the plenum floor up into the airstream at an area of higher airflow velocity above each ridge, thus aiding fuel vaporization and impeding the passage of liquid fuel along the runner portions of the floor.

3. The combination of claim 2 wherein said manifold runners are of essentially constant cross-sectional area throughout their lengths from the plenum to enlarged connection portions adjacent their ends.

4. An internal combustion engine having means defining an even number of paired cylinders, each having an intake port, the ports of each pair of cylinders having adjoining openings for connection with a single intake manifold runner, means for operating the engine such that the intake events of each pair of cylinders occupy staggered but connected cyclic intake intervals alternating with extended intervals of non-flow, and an intake manifold including a mixture supply runner for each pair of cylinders and connected to deliver air-fuel mixture only to both ports of its respective pair of cylinders, such that pulsing mixture flow in each said runner tends to cause unequal delivery of mixture to the ports of its respective cylinder pair, each said manifold runner being offset at its connection with is connected ports toward the first opening one of said connected ports in an amount that favors mixture delivery to said first opening port so as to counterbalance in substantial degree the tendency toward unequal delivery caused by pulsing flow in the respective runner and thereby tend to equalize cylinder charge distribution.

* * * * *